US011962005B2

(12) United States Patent
Makimura et al.

(10) Patent No.: US 11,962,005 B2
(45) Date of Patent: Apr. 16, 2024

(54) POSITIVE ELECTRODE ACTIVE MATERIAL AND SECONDARY BATTERY PROVIDED WITH POSITIVE ELECTRODE ACTIVE MATERIAL

(71) Applicant: PRIME PLANET ENERGY & SOLUTIONS, INC., Tokyo (JP)

(72) Inventors: Yoshinari Makimura, Nisshin (JP); Hiroyuki Yamaguchi, Toyota (JP); Masataka Tomita, Okazaki (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 365 days.

(21) Appl. No.: 17/499,420

(22) Filed: Oct. 12, 2021

(65) Prior Publication Data

US 2022/0123292 A1    Apr. 21, 2022

(30) Foreign Application Priority Data

Oct. 16, 2020  (JP) ................. 2020-174496

(51) Int. Cl.
*H01M 4/505* (2010.01)
*H01M 4/36* (2006.01)
(Continued)

(52) U.S. Cl.
CPC .......... *H01M 4/505* (2013.01); *H01M 4/366* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2003/0087154 A1    5/2003  Ohzuku et al.
2005/0106463 A1*   5/2005  Kikuchi ............. C01G 45/1228
                                                            429/231.1
(Continued)

FOREIGN PATENT DOCUMENTS

CN    1801509 A    7/2006
CN    105932247 A  9/2016
(Continued)

OTHER PUBLICATIONS

Pavithra S. et al., "Surface Modification and Electrochemical Performance of $Al_2O_3$ Coated and Ni-Doped Spinel $LiMn_2O_4$ for Aqueous Rechargeable Battery Applications", ISSN 1068-3755, Surface Engineering and Applied Electrochemistry, 2020, vol. 56, No. 4, pp. 432-439.

(Continued)

*Primary Examiner* — Carlos Barcena
(74) *Attorney, Agent, or Firm* — Finnegan, Henderson, Farabow, Garrett & Dunner, LLP (57) ABSTRACT

The present disclosure provides a positive electrode active material having a spinel-type crystal structure that can reduce an increase in resistance and a decrease in capacity retention rate due to repeated charging and discharging of a non-aqueous electrolyte secondary battery. The positive electrode active material disclosed herein is configured of a lithium manganese composite oxide having a spinel-type crystal structure, wherein the lithium manganese composite oxide includes secondary particles in which a plurality of primary particles are aggregated, an average particle diameter of the secondary particles based on a SEM image is 10 μm or more and 20 μm or less, an average particle diameter of the primary particles based on a SEM image is 4 μm or more and 8 μm or less, and nickel atoms are provided in the surface layer portion of the secondary particles.

6 Claims, 3 Drawing Sheets

(51) Int. Cl.
H01M 4/525 (2010.01)
H01M 10/0525 (2010.01)
*H01M 4/02* (2006.01)

(56) References Cited

U.S. PATENT DOCUMENTS

2017/0309907 A1  10/2017  Mitsumoto et al.
2018/0375097 A1  12/2018  Ozoemena et al.
2020/0194788 A1   6/2020  Mitsumoto et al.

FOREIGN PATENT DOCUMENTS

| CN | 107074584 A | 8/2017 |
| CN | 107482213 A | 12/2017 |
| CN | 108604673 A | 9/2018 |
| JP | 2000-340226 A | 12/2000 |
| JP | 2001-319648 A | 11/2001 |
| JP | 2010-511990 A | 4/2010 |
| JP | 2012-246199 A | 12/2012 |
| WO | WO 2008-069351 A1 | 6/2008 |
| WO | WO 2016/175313 A1 | 11/2016 |
| WO | WO 2017/109646 A1 | 6/2017 |
| WO | WO 2019/044733 A1 | 3/2019 |

OTHER PUBLICATIONS

Shu-Juan Bao, et al., "Enhancement of the Electrochemical Properties of $LiMn_2O_4$ Through $Al^{3+}$ and $F^-$ Co-Substitution", Journal of Colloid and Interface Science 291 (2005), pp. 433-437.

Peilai Bai, et al., "Ni-Doped Layered Manganese Oxide as a Stable Cathode for Potassium-Ion Batteries", ACS Appl. Mater. Interfaces 2020, 12, pp. 10490-10495.

\* cited by examiner

POSITIVE ELECTRODE ACTIVE MATERIAL AND SECONDARY BATTERY PROVIDED WITH POSITIVE ELECTRODE ACTIVE MATERIAL

CROSS-REFERENCE TO RELATED APPLICATIONS

This application claims priority based on Japanese Patent Application No. 2020-174496 filed on Oct. 16, 2020, and the entire contents of the application are incorporated herein by reference.

BACKGROUND

1. Technical Field

The present disclosure relates to a positive electrode active material and a non-aqueous electrolyte secondary battery provided with the positive electrode active material.

2. Description of the Background

In recent years, secondary batteries such as lithium ion secondary batteries have been advantageously used as portable power sources for personal computers, mobile terminals, etc., and vehicle drive power sources for electric vehicles (EV), hybrid vehicles (HV), plug-in hybrid vehicles (PHV) etc.

A positive electrode of a lithium ion secondary battery is generally provided with a positive electrode active material capable of occluding and releasing lithium ions. Lithium transition metal oxides (lithium transition metal composite oxides) are generally used as the positive electrode active material, and as one of the typical structures thereof a spinel-type crystal structure is known. For example, Japanese Patent Application Publication No. 2012-246199 discloses that by calcining hydroxide particles having fine primary particles and setting the average particle diameter of a positive electrode active material (lithium-containing composite oxide) having a spinel-type crystal structure in the range of 2 μm to 8 μm, a favorable battery output is realized, and by suppressing the spread of the particle size distribution, a favorable cycle capacity retention rate is realized. Further, Japanese Translation of PCT Application No. 2010-511990 discloses a positive electrode active material which is a spinel-type lithium manganese composite oxide having a core-shell structure and in which a predetermined metal element (3d transition metal or zinc) is substituted in the shell portion. It is disclosed that the shell portion of such a configuration exhibits high thermal stability and low reactivity with the electrolytic solution, whereby the cycle life is improved.

SUMMARY

The results of diligent studies conducted by the present inventor have shown that in Japanese Patent Application Publication No. 2012-246199, since the specific surface area of the positive electrode active material is increased by the fine primary particles, the area of contact with the electrolytic solution is increased, and a favorable battery output is realized, but manganese atoms tend to elute easily. That is, the elution of manganese atoms may accelerate the deterioration of the positive electrode active material. Further, it was found that in Japanese Translation of PCT Application No. 2010-511990, since the particle diameter of the positive electrode active material is not optimized, the active material particles tend to be easily broken in the pressing step at the time of electrode fabrication and during charging and discharging. As a result, manganese atoms may be eluted from the fracture surface and the cycle life may be shortened. Therefore, there is room for improvement.

Accordingly, the present disclosure has been made in view of the above circumstances, and it is a main object thereof to provide a positive electrode active material having a spinel-type crystal structure that can reduce an increase in resistance and a decrease in capacity retention rate due to repeated charging and discharging of a non-aqueous electrolyte secondary battery. Another object is to provide a non-aqueous electrolyte secondary battery provided with such a positive electrode active material.

As a result of diligent studies conducted to solve the above problems, the present inventor has found that where, in a positive electrode active material (lithium manganese composite oxide) having secondary particles composed of primary particles having a larger average particle diameter than that of conventional primary particles, a surface layer portion of the secondary particles is substituted by a predetermined amount of nickel atoms, in a non-aqueous electrolyte secondary battery provided with the positive electrode active material, the capacity deterioration resistance during repeated charging and discharging is improved and the resistance increase rate is suppressed, and it was also found that the initial resistance could be reduced.

That is, the positive electrode active material disclosed herein and suitable for a non-aqueous electrolyte secondary battery includes a lithium manganese composite oxide having a spinel-type crystal structure, wherein the lithium manganese composite oxide includes secondary particles in which a plurality of primary particles is aggregated, an average particle diameter of the secondary particles based on a SEM image is 10 μm or more and 20 μm or less, an average particle diameter of the primary particles based on a SEM image is 4 μm or more and 8 μm or less, and nickel atoms are provided in a surface layer portion of the secondary particles.

With such a configuration, it is possible to provide a positive electrode active material capable of providing a non-aqueous electrolyte secondary battery with excellent capacity deterioration resistance against repeated charging and discharging, and also capable of reducing both the initial resistance and the resistance increase rate due to charging and discharging.

In a preferred embodiment of the positive electrode active material disclosed herein, the nickel atoms are unevenly distributed in the surface layer portion of the secondary particles.

With such a configuration, it is possible to impart more excellent capacity deterioration resistance to the non-aqueous electrolyte secondary battery, and further reduce the initial resistance and the resistance increase rate due to charging and discharging.

Further, in a preferred embodiment of the positive electrode active material disclosed herein, an average value of a molar ratio (Ni/Mn) of nickel atoms to manganese atoms at a position showing a maximum concentration of the nickel atoms measured by energy dispersive X-ray spectroscopy (EDX) along a longest diameter of the secondary particle in a cross-sectional SEM image of the secondary particle is 0.14 or more and 0.31 or less.

With such a configuration, the capacity deterioration resistance improvement effect and the effect of reducing the initial resistance and the resistance increase rate due to charging and discharging can be realized at a high level.

Further, in a preferred embodiment of the positive electrode active material disclosed herein, an average thickness of the surface layer portion of the secondary particles in which the nickel atoms are unevenly distributed is 0.3 μm or more and 2.5 μm or less.

With such a configuration, the capacity deterioration resistance improvement effect and the effect of reducing the initial resistance and the resistance increase rate due to charging and discharging can be realized at a high level.

Further, in a preferred embodiment of the positive electrode active material disclosed herein, the positive electrode active material includes at least aluminum atoms or magnesium atoms.

With such a configuration, the outstanding capacity deterioration resistance improvement effect and the effect of reducing the initial resistance and the resistance increase rate due to charging and discharging can be realized.

Further, in order to solve the above problems, a non-aqueous electrolyte secondary battery provided with the positive electrode active material disclosed herein is provided. That is, the non-aqueous electrolyte secondary battery disclosed herein includes a positive electrode, a negative electrode, and a non-aqueous electrolyte, wherein the positive electrode includes a positive electrode active material layer, and the positive electrode active material layer includes the positive electrode active material disclosed herein.

With such a configuration, it is possible to realize a non-aqueous electrolyte secondary battery that is excellent in capacity deterioration resistance during repeated charging and discharging and is excellent in the effect of reducing the initial resistance and the resistance increase rate.

DETAILED DESCRIPTION

Hereinafter, one embodiment of the present disclosure will be described with reference to the drawings. Matters other than those specifically mentioned in the present specification and necessary for implementation can be ascertained as design matters for a person skilled in the art that are based on the related art in the pertinent field. The present disclosure may be carried out based on the contents disclosed in the present specification and the common technical knowledge in the pertinent field. Further, in the following drawings, members/parts having the same function may be designated by the same reference numerals, and duplicate description may be omitted or simplified. Further, the dimensional relations (length, width, thickness, etc.) in each drawing do not reflect the actual dimensional relations.

Further, where the numerical range is described as A to B (where A and B are arbitrary numerical values) in this description, it is the same as the general interpretation and means A or more and B or less, and this is inclusive of the range above A and below B.

As used herein, the term "secondary battery" generally refers to a battery that can be repeatedly charged and discharged, and is inclusive of a so-called storage battery (that is, a chemical battery) such as a lithium ion secondary battery and a capacitor (that is, a physical battery) such as an electric double layer capacitor). Further, in the present description, the "lithium ion secondary battery" is a secondary battery which uses lithium ions as a charge carrier and in which charging and discharging are performed by the transfer of electric charges associated with the lithium ions between a positive electrode and a negative electrode. Further, in the present description, the "active material" refers to a material that reversibly occludes and releases charge carriers. Hereinafter, the non-aqueous electrolyte secondary battery disclosed herein will be described by taking a lithium ion secondary battery as an example.

Figure 1:
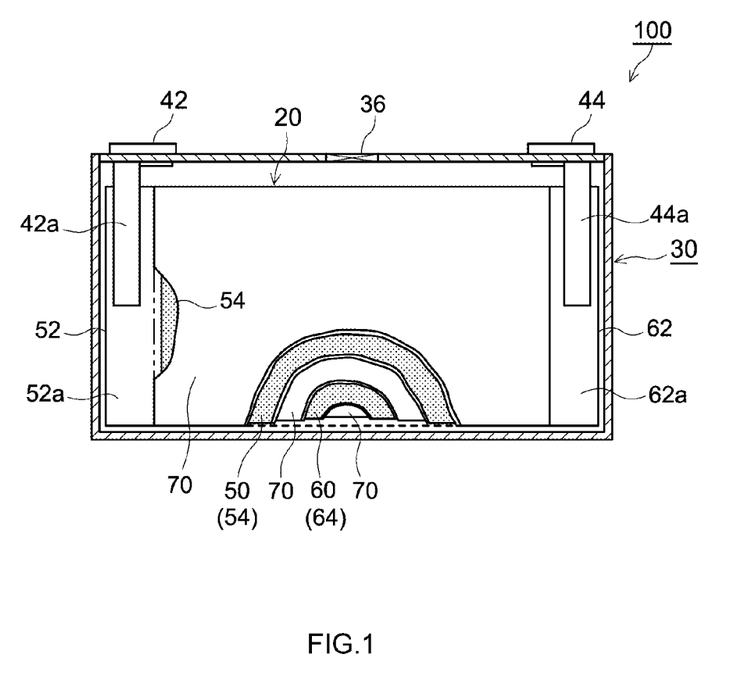
FIG. 1 is a cross-sectional view schematically showing the configuration of a non-aqueous electrolyte secondary battery according to an embodiment.

A lithium ion secondary battery 100 shown in FIG. 1 is an angular sealed battery constructed by accommodating a flat electrode body 20 and a non-aqueous electrolyte (not shown) inside a battery case 30. The battery case 30 is provided with a positive electrode terminal 42 and a negative electrode terminal 44 for external connection. Provided also is a thin-walled safety valve 36 that is set to release the internal pressure of the battery case 30 when the internal pressure rises above a predetermined level. Further, the battery case 30 is provided with a liquid injection port (not shown) for injecting the non-aqueous electrolyte. The material of the battery case 30 is preferably a metal material having high strength, light weight, and favorable thermal conductivity, and examples of such a metal material include aluminum and steel.

Figure 2:
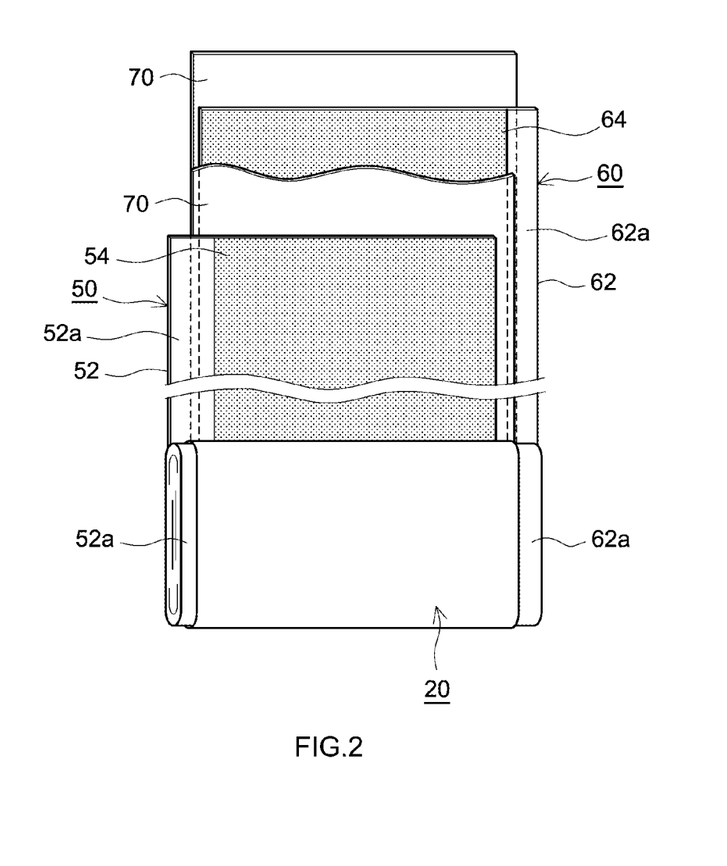
FIG. 2 is a schematic exploded view showing a configuration of a wound electrode body of a non-aqueous electrolyte secondary battery according to an embodiment.

The electrode body 20 is a wound electrode body obtained by laminating a long sheet-shaped positive electrode 50 and a long sheet-shaped negative electrode 60 with two long sheet-shaped separators 70 interposed therebetween, and winding the laminate around a winding shaft as shown in FIGS. 1 and 2. The positive electrode 50 includes a positive electrode current collector 52 and a positive electrode active material layer 54 formed in the longitudinal direction of one side or both sides of the positive electrode current collector 52. In an edge portion on one side in the winding axis direction (that is, the sheet width direction orthogonal to the longitudinal direction) of the positive electrode current collector 52, the positive electrode active material layer 54 is not formed in a band shape along the edge to provide a portion where the positive electrode current collector 52 is exposed (that is, a positive electrode current collector exposed portion 52a). Further, the negative electrode 60 includes a negative electrode current collector 62 and a negative electrode active material layer 64 formed in the longitudinal direction of one side or both sides of the negative electrode current collector 62. In an edge portion on the opposite side in the winding axis direction of the negative electrode current collector 62, the negative electrode active material layer 64 is not formed in a band shape along the edge to provide a portion where the negative electrode current collector 62 is exposed (that is, a negative electrode current collector exposed portion 62a). A positive electrode current collector plate 42a and a negative electrode current collector plate 44a are joined to the positive electrode current collector exposed portion 52a and the negative electrode current collector exposed portion 62a, respectively. The positive electrode current collector plate 42a is electrically connected to the positive electrode terminal 42 for external connection, and realizes conduction between the inside and the outside of the battery case 30. Similarly, the negative electrode current collector plate 44a is electrically connected to the negative electrode terminal 44 for external connection, and realizes conduction between the inside and the outside of the battery case 30.

The positive electrode current collector 52 constituting the positive electrode 50 can be exemplified by an aluminum foil. The positive electrode active material layer 54 includes the positive electrode active material disclosed herein. Further, the positive electrode active material layer 54 may include a conductive material, a binder, and the like. As the conductive material, for example, carbon black such as acetylene black (AB) or other carbon materials (graphite or the like) can be preferably used. As the binder, for example, polyvinylidene fluoride (PVDF) or the like can be used.

The negative electrode current collector 62 constituting the negative electrode 60 can be exemplified by a copper foil and the like. The negative electrode active material layer 64 includes a negative electrode active material. As the negative electrode active material, for example, a carbon material such as graphite, hard carbon, or soft carbon can be used. Further, the negative electrode active material layer 64 may further include a binder, a thickener, and the like. As the binder, for example, styrene butadiene rubber (SBR) or the like can be used. As the thickener, for example, carboxymethyl cellulose (CMC) or the like can be used.

As the separator 70, various microporous sheets similar to those conventionally used for lithium ion secondary batteries can be used, an example thereof being a microporous resin sheet made of a resin such as polyethylene (PE) or polypropylene (PP). The microporous resin sheet may have a single-layer structure or a multi-layer structure having two or more layers (for example, a three-layer structure in which PP layers are laminated on both sides of a PE layer). Further, the surface of the separator 70 may be provided with a heat-resistant layer (HRL).

The same non-aqueous electrolyte as in the conventional lithium ion secondary battery can be used. For example, a non-aqueous electrolytic solution including a supporting salt in an organic solvent (non-aqueous solvent) can be used. As the non-aqueous solvent, aprotic solvents such as carbonates, esters and ethers can be used. Among them, carbonates, for example, ethylene carbonate (EC), diethyl carbonate (DEC), dimethyl carbonate (DMC), ethyl methyl carbonate (EMC) and the like can be advantageously adopted. Alternatively, a fluorinated solvent such as a fluorinated carbonate such as monofluoroethylene carbonate (MFEC), difluoroethylene carbonate (DFEC), monofluoromethyldifluoromethyl carbonate (F-DMC), or trifluorodimethyl carbonate (TFDMC) can be preferably used. As such a non-aqueous solvent, one type can be used alone, or two or more types can be used in combination as appropriate. As the supporting salt, for example, a lithium salt such as $LiPF_6$, $LiBF_4$, and $LiClO_4$ can be advantageously used. The concentration of the supporting salt is not particularly limited, but is preferably about 0.7 mol/L or more and 1.3 mol/L or less.

The non-aqueous electrolyte may include components other than the above-mentioned non-aqueous solvent and supporting salt as long as the effects shown in the present disclosure are not significantly impaired. For example, various additives such as a gas generator, a film-forming agent, a dispersant, and a thickener may be included.

Figure 3:
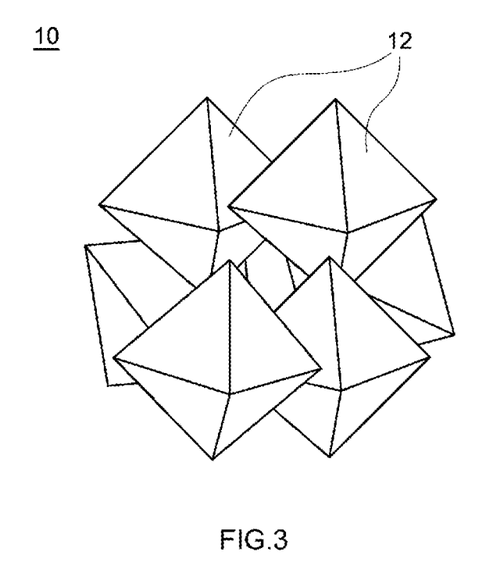
FIG. 3 is a general view schematically showing the structure of secondary particles constituting the positive electrode active material according to the embodiment.

The positive electrode active material disclosed herein is configured of a lithium manganese composite oxide having a spinel-type crystal structure. The lithium manganese composite oxide having a spinel-type crystal structure is an oxide having a spinel-type crystal structure and including at least Li, Mn, and O as constituent elements. FIG. 3 is a general view schematically showing the structure of a secondary particle of the positive electrode active material according to the embodiment. As shown in FIG. 3, the secondary particle 10 constituting the positive electrode active material is configured of a plurality of primary particles 12 aggregated together. The primary particles 12 are configured of a lithium manganese composite oxide having a spinel-type crystal structure.

In the present description, the "primary particle" means the smallest unit of the particles constituting the positive electrode active material, and specifically, the smallest unit determined from the apparent geometrical form. Moreover, the aggregate of such primary particles is called "secondary particle".

The average primary particle diameter based on the SEM image of the positive electrode active material disclosed herein is preferably 4 μm or more, and more preferably 0.5 μm or more. When the average primacy particle diameter is small, the specific surface area becomes too large, so that the contact area with the electrolyte increases excessively, and manganese atoms contained in the positive electrode active material are easily eluted. As a result, the capacity retention rate tends to decrease and the electrical resistance tends to increase with the long-term use of the lithium ion secondary battery. The average primary particle diameter is preferably 8 μm or less, and may be, for example, 7 μm or less and 6 μm or less. Where the average particle diameter of primary particles is too large (for example, primary particles having a particle diameter of 10 μm or more), the diffusion of lithium ions in the solid phase may decrease and the resistance may increase. Further, where charging and discharging are repeated, the particles are likely to be cracked. Therefore, the average primary particle diameter is preferably 4 μm to 8 μm, and more preferably 5 μm to 8 μm. Within such a range, it is possible to suppress a decrease in the capacity retention rate and a resistance increase rate due to repeated charging and discharging of the lithium ion secondary battery.

The average secondary particle diameter based on the SEM image of the positive electrode active material disclosed herein is preferably 10 μm or more and 20 μm or less, more preferably 11 μm or more and 20 μm or less, and even more preferably 12 μm or more and 15 μm or less. Where the secondary particle diameter is larger than this range, the diffusion of lithium ions in the solid phase may decrease and the resistance may increase. Therefore, by setting the average primary particle diameter within the above suitable range and the average secondary particle diameter within the above range, favorable lithium ion diffusivity can be maintained, and the initial resistance and the resistance increase rate due to repeated charging and discharging can be suitably suppressed. Further, within such ranges, the elution of manganese atoms from the positive electrode active material is suitably suppressed, so that the capacity retention rate of the lithium ion secondary battery can be further improved.

The average secondary particle diameter and the average primary particle diameter of the positive electrode active material disclosed herein can be measured based on an image observed using a scanning electron microscope (SEM). Specifically, first, a volume-based particle size distribution is measured using a particle size distribution measuring device based on a general laser diffraction/light scattering method, and the particle diameter corresponding to the cumulative 50% by volume from a small particle side (median diameter: D50) is measured. Next, the positive electrode active material is observed at a plurality of locations by SEM, a plurality of SEM images is acquired, and then a plurality of secondary particles (for example, 30 or more) having a size corresponding to D50 is randomly selected. Next, the length of the longest diameter of each of the plurality of selected secondary particles is defined as a major axis, and the length of the longest diameter of the lines intersecting the major axis at a right angle is defined as a minor axis. The particle diameter of the secondary particles is calculated by converting the area of the ellipse having the major axis and the minor axis into an equivalent circle diameter. The average value of the particle diameters of the plurality of selected secondary particles can be calculated as the average secondary particle diameter. In the present description, the "average secondary particle diameter" means the average value calculated in this way.

Further, in the present description, the "average primary particle diameter" means the average value of the particle diameter of primary particles for which the entire length of the particle diameter can be visually recognized (that is, no portion thereof is hidden by other primary particles) in the SEM image among the primary particles constituting each secondary particle among the plurality of selected secondary particles. One or more primary particles for which the particle diameter is calculated from each of the plurality of selected secondary particles are selected. A method for calculating the particle diameter of the primary particles is the same as the method for calculating the particle diameter of the secondary particles described above. This diameter can be calculated by determining the major axis and the minor axis and converting the area of the ellipse having the major axis and the minor axis into an equivalent circle diameter.

The positive electrode active material disclosed herein may include one or two or more additive elements in addition to Li, Mn, and O as constituent elements of the lithium manganese composite oxide. Typically, a lithium manganese composite oxide having a spinel-type crystal structure can be exemplified by a compound represented by a general formula (1):

$$Li_{1+z}Mn_{2-x-z}Me_xO_4$$

(in the formula, Me represents an optional metal element of at least one kind, and x and z satisfy 0≤x≤0.25 and 0<z≤0.15, respectively). Examples of such additive elements (Me) include transition metal elements and typical metal elements such as Ni, Co, Mg, Ca, Al, Ti, V, Cr, Y, Zr, Nb, Mo, Hf, Ta, W, Na, Fe, Zn, and Sn. Among these, it is preferable to include a nickel (Ni) atom. Since the valence of the manganese atom constituting the lithium manganese composite oxide can be increased to around four by including a nickel atom, the elution of the manganese atom can be advantageously suppressed. As a result, the capacity retention rate of the lithium ion secondary battery can be improved.

The average chemical composition of the positive electrode active material can be measured by, for example, inductively coupled plasma (ICP) emission spectroscopic analysis.

The average content ratio of nickel atoms that can be contained in the lithium manganese composite oxide is shown by the value of y when the nickel-containing lithium manganese composite oxide (lithium nickel manganese composite oxide) is represented by the general formula (2):

$$Li_{1+z}Ni_yMn_{2-x-y-z}Me_xO_4$$

(in the formula, Me represents an optional metal element of at least one kind, and x, y and z satisfy 0≤x≤0.25, 0<z≤0.15, and x+y≤0.25. In the general formula (2), y is preferably in the range of 0.04≤y≤0.2, more preferably 0.05≤y≤0.15, and it is even more preferable that 0.05≤y≤0.1. By setting the average content ratio of nickel atoms within such a range, the lithium ion diffusivity can be improved, and the elution of manganese atoms can be further suppressed.

Examples of the additive elements (Me) in the general formula (2) include transition metal elements and typical metal elements such as Co, Mg, Ca, Al, Ti V, Cr Y, Zr, Nb, Mo, Hf, Ta, W, Na, Fe, Zn, and Sn.

Further, it is preferable that the nickel atoms that can be contained in the lithium manganese composite oxide be unevenly distributed in the surface layer portion of the secondary particles. As a result, the valence of the manganese atoms present in the surface layer portion of the secondary particle can be increased to around four, so that the elution of the manganese atoms can be further suppressed. In addition, it is possible to improve the diffusion of lithium ions in the solid phase in the secondary particles and reduce the electrical resistance. Further, since the nickel atoms are unevenly distributed in the surface layer portion, the expansion and contraction of the particles during charging and discharging are locally suppressed, so that the cracking of the particles due to charging and discharging can be suppressed.

Further, it is preferable that the nickel atoms that can be contained in the lithium manganese composite oxide be unevenly distributed through a predetermined thickness of the surface layer portion of the secondary particle. The average thickness of the surface layer portion is, for example, less than 3 μm, preferably 2.5 μm or less, more preferably 2 μm or less (for example, 1.4 μm or less), and further preferably 1 μm or less. By unevenly distributing nickel atoms through the thickness in such a range, the valence of manganese atoms near the surface of secondary particle that easily comes into contact with the electrolyte can be more advantageously raised to around four, and the elution of manganese atoms can be further suppressed.

Further, although the lower limit of the average thickness of the surface layer portion of the secondary particles is not limited, the average thickness of the surface layer portion of the secondary particles is preferably 0.3 μm or more, and more preferably 0.5 μm or more. As a result, a certain amount of nickel atoms can be arranged in the surface layer portion of the secondary particle, so that the effect of the nickel atoms unevenly distributed in the surface layer portion described above can be sufficiently exerted. Therefore, the average thickness of the surface layer portion of the secondary particles is, for example, preferably 0.3 μm or more and 2.5 μm or less, more preferably 0.3 μm or more and 2 μm or less, and further preferably 0.5 μm or more and 1 μm or less.

The average thickness of the surface layer portion of the secondary particles in which the above-mentioned nickel atoms are unevenly distributed can be measured as follows.

First, the positive electrode active material is embedded in a resin, a rough cross section is prepared, and then the cross section is processed by a cross section polisher (CP) method. Next, the cross section after cross-section processing is observed by SEM, and a plurality of (for example, 30 or more) secondary particles having a size corresponding to D50 is randomly selected. Then, for each of the plurality of selected secondary particles, line analysis is performed using energy dispersive X-ray spectroscopy (EDX) along the length of the longest diameter of the secondary particles.

Based on the strength distribution of nickel atoms obtained in this way, the length from the end of the secondary particle to 30% of the maximum value of the strength of the nickel atoms in the secondary particle is taken as a thickness where the nickel atoms are unevenly distributed. Such calculation is performed at both ends of the longest diameter of each of the plurality of selected secondary particles, and the average value of the length (thickness) calculated for the plurality of selected secondary particles is obtained. In the present description, the average value of the length (thickness) calculated in this way is referred to as "the average thickness of the surface layer portion of the secondary particles" in which nickel atoms are unevenly distributed. In one embodiment of the positive electrode active material disclosed herein, since the nickel atoms are unevenly distributed in the surface layer portion of the secondary particles, the maximum value of the strength of the nickel atoms is present in the surface layer portion of the secondary particles.

In the surface layer portion of secondary particles, the average value of the molar ratio (Ni/Mn) of nickel atoms to manganese atoms at a position showing the maximum value (maximum concentration) of nickel atoms measured by the above method (line analysis by EDX) is 0.14 or more and 0.31 or less, more preferably 0.18 or more and 0.28 or less, and even more preferably 0.18 or more and 0.25 or less. Where the average value of the molar ratio is too small, the valence of manganese atoms in the surface layer portion of the secondary particles cannot be sufficiently increased, and the elution of manganese atoms may be insufficiently suppressed. Further, where the average value of the molar ratio is too large, the diffusion of lithium ions in the solid phase may decrease. Therefore, by setting the average value of the molar ratio within the above range, the elution of manganese atoms constituting the secondary particles can be more advantageously suppressed, and the decrease in the diffusivity of lithium ions can also be suppressed.

Further, it is more preferable that the lithium manganese composite oxide further include an aluminum atom and/or a magnesium atom in addition to the nickel atom. Since the aluminum atom and the magnesium atom have a property that the valence does not change during charging and discharging of the positive electrode active material, the elution of manganese atom due to repeated charging and discharging can be further suppressed. In addition, the diffusion of lithium ions in the solid phase can be further improved, and the electrical resistance can be further reduced.

A lithium nickel manganese composite compound including an aluminum atom and/or a magnesium atom typically can be exemplified by a compound represented by a general formula (3):

$$Li_{1+z}Ni_yMn_{2-x-y-z}Me_xO_4$$

(in the formula, Me represents Al and/or Mg, x, y, and z are $0<x\leq0.1$, $0<y\leq0.2$, $0<z\leq0.15$, respectively, and $x+y\leq0.25$). In addition to Al and Mg, the additive element (Me) can include, for example, a transition metal element and a typical metal element such as Co, Ca, Ti, V, Cr, Y, Zr, Nb, Mo, Hf, Ta, W, Na, Fe, Zn, and Sn.

Next, a suitable method for manufacturing the positive electrode active material disclosed herein will be described. A method for manufacturing the positive electrode active material disclosed herein is not limited to the following.

A suitable method for manufacturing the positive electrode active material particles disclosed herein includes a step of precipitating hydroxide particles including at least manganese as precursor particles (hereinafter, also referred to as "precursor precipitation step"), a step of growing the particles in a solution including nickel and a transition metal that will constitute the precursor particles (that is, in a solution including at least nickel and manganese) (hereinafter, also referred to as "precursor particle growth step"), a step of obtaining a mixture of the precursor particles obtained in the precursor particle growth step and a lithium compound (hereinafter, also referred to as a "mixing step"), and a step of calcining the mixture to obtain a lithium nickel-manganese composite oxide (hereinafter, also referred to as a "calcining step").

First, the precursor precipitation step will be described. The precursor precipitation step may be the same as a known method in the production of a usual cathode active material. First, an aqueous solution in which at least a manganese compound is dissolved is prepared. As the manganese compound, for example, a water-soluble compound such as manganese sulfate, manganese nitrate, or manganese halide can be used. Also, an aqueous solution of an alkaline compound is prepared. As the alkaline compound, for example, lithium hydroxide, sodium hydroxide, potassium hydroxide and the like can be used, but sodium hydroxide is preferably used. Also, aqueous ammonia is prepared.

Next, water (preferably ion-exchanged water) is added to the reaction vessel at 30° C. to 60° C. and stirred. Stirring is continued while replacing the atmosphere with an inert gas (for example, $N_2$ gas, Ar gas, etc.), and the aqueous solution of the alkaline compound is added to adjust the pH (for example, pH 10 to 13).

While continuing stirring, the aqueous solution of the manganese compound and aqueous ammonia are added to the reaction vessel. At this time, since the pH in the reaction vessel is lowered by these additions, the pH in the reaction vessel is adjusted to the range of 10 to 13 with the aqueous solution of the alkaline compound. Then, the reaction vessel is allowed to stand for a predetermined time (for example, 1 h to 3 h) to sufficiently precipitate the precursor particles (hydroxide particles).

Next, the precursor particle growth process will be described. First, an aqueous solution in which a nickel compound and a manganese compound are dissolved is prepared. As the nickel compound, a water-soluble compound such as nickel sulfate, nickel nitrate, or nickel halide can be used. Here, the concentration of nickel atoms contained in the positive electrode active material can be adjusted by changing the mixing ratio of the nickel compound and the manganese compound.

The aqueous solution of the nickel compound and the manganese compound, the aqueous solution of the alkaline compound, and ammonia solution are added while stirring the inside of the reaction vessel in which the precursor particles obtained in the precursor precipitation step were precipitated, and the inside of the reaction vessel is adjusted to a pH different from that in the precursor precipitation step (for example, a pH within the range of pH 10 to 13 but different). Then, the reaction vessel is allowed to stand for a predetermined time (for example, 1 h to 3 h) to sufficiently precipitate the precursor particles (composite hydroxide particles). As a result, it is possible to obtain precursor particles in which a nickel-containing composite hydroxide layer is formed on the surface of the hydroxide particles. Then, the precursor particles are collected by suction filtration or the like, washed with water, and then dried (for example, dried overnight at 120° C.). As a result, it is possible to obtain a powder of a composite hydroxide in which nickel atoms are unevenly distributed in the surface layer portion.

In the precursor particle growth step, the thickness of the nickel-containing composite hydroxide layer (the portion corresponding to the surface layer portion of the secondary particles after calcining) and the particle diameter of the composite hydroxide particles can be adjusted by adjusting the addition rate of various solutions and the pH in the reaction vessel.

Next, the mixing step will be described. As the lithium compound to be used herein, for example, a compound obtained by converting lithium carbonate, lithium nitrate, lithium hydroxide, and the like into an oxide by calcination can be used.

In addition to the obtained composite hydroxide powder and lithium compound powder, a flux having a predetermined concentration (typically 0.1% by mass or more and 50% by mass or less based on the mixture of the powders) is added. By adding the flux and mixing, the particle growth of the primary particles can be promoted in the calcining step described hereinbelow, so that the particle diameter of the primary particles can be increased. The type of the flux is not particularly limited, and a known flux (for example, $B_2O_3$ powder) can be used. The particle diameter of the primary particles can be adjusted by adjusting the amount (concentration) of the flux to be mixed.

A mixture can be obtained by using a known mixing device (for example, a shake mixer, a V blender, a ribbon mixer, a Julia mixer, a Loedige mixer, and the like) and mixing by a known method.

The elemental ratio of the desired positive electrode active material can be obtained by adjusting the mixing ratio of the composite hydroxide powder and the lithium compound.

Next, the calcining step will be described. The resulting mixture can be calcined using, for example, a batch type electric furnace, a continuous type electric furnace, or the like. The obtained mixture is pressure molded and then heated at 500° C. to 600° C. for 6 h to 12 h in an air atmosphere. The mixture is then cooled, and the pressure-molded mixture is crushed and remolded. The remolded mixture is calcined at 900° C. to 1000° C. for 6 h to 24 h. Then, for example, an annealing treatment is performed at 700° C. for 12 h to 48 h. After the annealing treatment, the mixture can be cooled and pulverized again to obtain a positive electrode active material (lithium nickel manganese composite oxide). The rate of temperature rise during calcining can be, for example, 5° C./min to 40° C./min (typically 10° C./min). Further, although not particularly limited, the cooling method can be carried out by turning off the power of the electric furnace used for calcining and allowing the furnace to cool naturally.

The particle diameter of the primary particles can be adjusted by adjusting the concentration of the flux, the calcining temperature, and the calcining time.

The method for manufacturing the positive electrode active material disclosed herein has been described hereinabove, but for example, when the positive electrode active material includes an aluminum atom and/or a magnesium atom, the positive electrode active material can be manufactured by further mixing a compound powder (for example, aluminum hydroxide and the like) and/or a magnesium compound (for example, magnesium hydroxide and the like) in addition to the composite hydroxide powder, lithium compound powder, and flux in the mixing step. It is preferable to use an aluminum compound and a magnesium compound such that are converted into oxides by calcination. Further, by adjusting the mixing amount of such compounds, a positive electrode active material having a desired element ratio can be obtained.

The lithium ion secondary battery 100 can be used for various purposes. For example, it can be suitably used as a high-output power source (driving power source) for a motor mounted on a vehicle. The type of vehicle is not particularly limited, but typical examples thereof include automobiles such as plug-in hybrid vehicles (PHVs), hybrid vehicles (HVs), and electric vehicles (EVs). The lithium ion secondary battery 100 can also be used in the form of a battery pack in which a plurality of lithium ion secondary batteries 100 are electrically connected.

As an example, an angular lithium ion secondary battery equipped with a flat wound electrode body has been described above. However, this is only an example and is not limiting. Another example is a non-aqueous electrolyte secondary battery provided, instead of the wound electrode body, with a laminated electrode body in which a sheet-shaped positive electrode and a sheet-shaped negative electrode are alternately laminated with a separator interposed therebetween. Yet another example is a polymer battery that uses a polymer electrolyte. Further, a cylindrical battery case, a coin-shaped battery case, or the like may be used instead of the angular battery case, or a laminated secondary battery using a laminated film instead of the battery case may be used.

Hereinafter, examples relating to the present disclosure will be described, but the present disclosure is not intended to be limited to those examples.

Test 1

The influence of the difference in the average primary particle diameter and the average secondary particle diameter of the positive electrode active material having a spinel-type crystal structure on the initial resistance of the lithium ion secondary battery and the resistance increase rate and capacity retention rate after the cycle test was examined.

Preparation of Positive Electrode Active Material

Examples 1 and 2

Manganese sulfate was dissolved in ion-exchanged water, and an aqueous manganese sulfate solution was prepared so as to have a predetermined concentration. In addition, a sodium hydroxide aqueous solution and an ammonia aqueous solution were prepared using ion-exchanged water.

The ion-exchanged water was stirred while being kept within the range of 30° C. to 60° C., and adjusted to a predetermined pH (pH 10 to 13) by using the sodium hydroxide aqueous solution. Then, a coprecipitation product (hydroxide) was obtained by adding the above-mentioned manganese sulfate aqueous solution, sodium hydroxide aqueous solution and ammonia aqueous solution while controlling the predetermined pH. The obtained hydroxide was filtered, washed with water, and then dried in an oven at 120° C. to obtain a hydroxide powder (positive electrode active material precursor powder). The ion-exchanged water used herein was used after the dissolved oxygen was removed by passing an inert gas therethrough in advance.

The obtained hydroxide powder and lithium hydroxide powder were prepared so that the molar ratio (Li/Mn) of lithium (Li) to manganese (Mn) was 0.58, and $B_2O_3$ as a flux was added at a predetermined concentration and mixed. The mixture was pressure molded, heated at 550° C. for 12 h in an air atmosphere, cooled and then pulverized. The pulverized mixture was remolded, calcined at 900° C. to 1000° C. for 6 h to 24 h, and then annealed at 700° C. for 12 h to 48 h. The rate of temperature rise during firing was 10° C./min.

After cooling, the obtained mixture was pulverized to obtain positive electrode active materials of Examples 1 and 2.

The average particle diameter of the primary particles was adjusted by changing the concentration of $B_2O_3$, the calcining temperature, and the calcining time.

Preparation of Lithium Ion Secondary Battery for Evaluation

For the lithium secondary battery for evaluation, the prepared positive electrode active material, carbon black (CB) as a conductive material, and polyvinylidene fluoride (PVDF) as a binder were mixed in N-methyl-2-pyrrolidone at a mass ratio of the positive electrode active material:CB:PVDF=90:8:2 to prepare a paste for forming a positive electrode active material layer. This paste was applied to an aluminum foil current collector, dried, and then pressed to prepare a sheet-shaped positive electrode.

Natural graphite (C) as a negative electrode active material, styrene-butadiene rubber (SBR) as a binder, and carboxymethyl cellulose (CMC) as a thickener were mixed in ion-exchanged water at a mass ratio of C:SBR:CMC=98:1:1 to prepare a paste for forming a negative electrode active material layer. This paste was applied to a copper foil current collector, dried, and then pressed to prepare a sheet-shaped negative electrode.

In addition, a porous polyolefin sheet having a three-layer structure of PP/PE/PP was prepared as a separator.

The prepared sheet-shaped positive electrode and negative electrode were laminated facing each other with a separator interposed therebetween to prepare a laminated electrode body. Current collecting terminals were attached to the laminated electrode body, and the electrode body was housed in an aluminum laminated bag. Then, the laminated electrode body was impregnated with a non-aqueous electrolytic solution, and the opening of the aluminum laminated bag was closed and sealed to prepare a lithium ion secondary battery for evaluation. The non-aqueous electrolyte solution was prepared by dissolving $LiPF_6$ as a supporting salt at a concentration of 1.0 mol/L in a mixed solvent including ethylene carbonate (EC), dimethyl carbonate (DMC) and ethyl methyl carbonate (EMC) in a volume ratio of 3:4:3

Calculation of Average Primary Particle Diameter and Average Secondary Particle Diameter The median diameter (D50) was measured using a laser diffraction type particle size distribution measuring device for each of the produced positive electrode active materials.

Next, SEM images of the produced positive electrode active materials were obtained. From the obtained SEM images, 30 secondary particles having a size corresponding to D50 were arbitrarily (randomly) selected. Then, the particle diameters of the 30 secondary particles were calculated, and the average value thereof was taken as the average secondary particle diameter.

Further, for each of the 30 selected secondary particles, one or more particle diameters were calculated from the primary particles constituting the secondary particles, and the average value thereof was taken as the average primary particle diameter.

Composition Analysis of Positive Electrode Active Material

Inductively coupled plasma (ICP) emission spectroscopic analysis was performed on the positive electrode active material produced above, and the amount of each element was measured.

Activation Treatment and Measurement of Initial Discharge Capacity

Each of the prepared lithium ion secondary batteries for evaluation was constant-current charged with a current value of 0.1 C to 4.2 V, and then constant-voltage charged until the current value at the time of constant-voltage charging became 1/50 C to obtain a fully charged state. Then, each lithium ion secondary battery for evaluation was discharged to 3.0 V at a current value of 0.1 C by a constant current method, and the discharge capacity at this time was taken as the initial discharge capacity. The charge/discharge operation was performed at 25° C.

Measurement of Initial Battery Resistance

Each lithium ion secondary battery for evaluation was adjusted to a state of 50% (SOC=50%) of the battery capacity. Next, currents were passed at various current values in an environment of −10° C., and the battery voltage after 2 sec was measured. The current that flowed and voltage changes were linearly interpolated, and battery resistance (initial battery resistance) was calculated from the slope thereof. Then, the relative value of the initial resistance was calculated by taking the initial resistance of Example 1 as 1.0. The results are shown in Table 1.

Measurement of Resistance Increase Rate and Capacity Retention Rate after Durability A cycle test in an environment of 60° C. was conducted on each lithium ion secondary battery for evaluation for which the initial resistance was measured. Specifically, 50 cycles were repeated, with one cycle including constant-current charging up to 4.2 V at 1 C and then constant-current discharging up to 3.0 V at 1 C. Then, the discharge capacity and battery resistance after 50 cycles were measured by the same method as described above. The capacity retention rate after durability was calculated by the following Formula 1:

(Discharge capacity after 50 cycles)/(Initial discharge capacity)×100  Formula 1

In addition, the resistance increase rate after durability was calculated by the following Formula 2:

(Battery resistance after 50 cycles)/(Initial battery resistance)×100  Formula 2

For each of these calculated capacity retention rates after durability and resistance increase rates after durability, relative values were calculated by taking values obtained in Example 1 as 1.0. The results are shown in Table 1.

TABLE 1

|  | Average chemical composition | Average primary particle diameter (μm) | Average secondary particle diameter (μm) | Initial resistance | Resistance increase rate after durability | Capacity retention rate after durability |
| --- | --- | --- | --- | --- | --- | --- |
| Example1 | $Li_{1.1}Mn_{1.9}O_4$ | 1 | 11 | 1.00 | 1.00 | 1.00 |
| Example2 | $Li_{1.1}Mn_{1.9}O_4$ | 5 | 12 | 0.78 | 0.93 | 1.18 |

As shown in Table 1, in the lithium ion secondary battery using the positive electrode active material of Example 2 having a larger average primary particle diameter and average secondary particle diameter than the positive electrode active material of Example 1, the initial resistance and the resistance increase rate after durability decreased, and the capacity retention rate after durability improved. Therefore, it was confirmed that in the positive electrode active material having a spinel-type crystal structure, in particular, by controlling the primary particle diameter to be larger than that of the conventional battery (Example 1), the initial resistance and the resistance increase rate after the cycle test were reduced, and the capacity retention rate was improved.

Test 2

Positive electrode active materials (Examples 3 to 11) in which the positive electrode active material having a larger primary particle diameter than Example 1 was provided with a surface layer portion in which nickel atoms were unevenly distributed on the surface of the secondary particles were prepared and analyzed. Further, a positive electrode active material (Example 12) including an aluminum atom and a positive electrode active material including a magnesium atom (Example 13) in addition to the nickel atom were prepared, and the same test as in Test 1 was performed.

Examples 3 to 11

In the method for producing the positive electrode active material of Examples 1 and 2 described above, a step of forming a composite hydroxide layer on the surface of the hydroxide was added after the coprecipitation product (hydroxide) was obtained.

That is, manganese sulfate and nickel sulfate were dissolved in ion-exchanged water, and a mixed aqueous solution of manganese sulfate and nickel sulfate was prepared so as to have a predetermined concentration. At this time, the amount of nickel atoms contained in the composite hydroxide layer was changed by adjusting the molar ratio of nickel atoms to manganese atoms.

After the co-precipitation product (hydroxide) was obtained, the sodium hydroxide aqueous solution, ammonia aqueous solution and mixed solution were added, while controlling a pH different from the predetermined pH in the step of obtaining the hydroxide (however, within the range of pH 10 to 13), to obtain a composite hydroxide in which a composite hydroxide layer was formed on the surface of the co-precipitation product (hydroxide). At this time, the thickness and particle diameter of the composite hydroxide layer were changed by adjusting the addition rate and pH of the aqueous solution to be added.

In the next mixing step, the composite hydroxide powder and lithium hydroxide powder were prepared such that the ratio of the number of moles of lithium (Li) to the total number of moles of transition metal elements (Ni, Mn) had a predetermined value (see the average chemical composition of each example in Table 2).

The procedure was the same as in Examples 1 and 2 except that the concentration of $B_2O_3$, the firing temperature, and the firing time were changed.

Example 12

The procedure was the same as in Examples 3 to 11, except that aluminum hydroxide powder was further added when the composite hydroxide powder and lithium hydroxide powder were mixed, and the molar ratios of Li, Ni, Al, and Mn were set to predetermined values (see the average chemical composition of Example 12 in Table 2).

Example 13

The procedure was the same as in Example 12 except that the aluminum hydroxide powder was changed to magnesium hydroxide powder.

Analysis of Nickel-Containing Surface Layer Portion

Each of the prepared positive electrode active materials was embedded in a resin to prepare a rough cross section, and then the cross section was processed by the cross section polisher (CP) method. Next, an SEM image of the cross section was acquired, and 30 secondary particles having a size corresponding to D50 were randomly selected. Then, line analysis was performed using energy dispersive X-ray spectroscopy (EDX) along the length of the longest diameter of the selected secondary particles. At both ends of the secondary particles, the lengths up to 30% of the maximum value of the strength of nickel in the secondary particles were measured, and the average value thereof was shown in Table 2 as the average surface layer thickness.

In addition, the average value of the molar ratio (Ni/Mn) of the nickel atom to the manganese atom at the point showing the maximum value of the strength of the nickel atom when the above line analysis was performed was calculated and shown as the surface Ni content ratio in Table 2.

Lithium ion secondary batteries for evaluation of Examples 3 to 13 were prepared in the same manner as in Examples 1 and 2. In addition, various operations related to the measurement of the average particle diameter of the primary particles and the secondary particles, the composition analysis, and the evaluation test of the lithium ion secondary battery for evaluation were all performed in the same manner as in Examples 1 and 2. The results are shown in Table 2. The initial resistance, resistance increase rate after durability, and capacity retention rate after durability in Table 2 were shown as relative values with the results obtained in Example 2 taken as 1.0.

TABLE 2

| | Average chemical composition | Average primary particle diameter (μm) | Average secondary particle diameter (μm) | Average surface layer thickness (μm) | Surface layer Ni content ratio | Initial resistance | Resistance increase rate after durability | Capacity retention rate after durability |
|---|---|---|---|---|---|---|---|---|
| Example1 | $Li_{1.1}Mn_{1.9}O_4$ | 1 | 11 | 0 | 0 | 1.29 | 1.07 | 0.85 |
| Example2 | $Li_{1.1}Mn_{1.9}O_4$ | 5 | 12 | 0 | 0 | 1.00 | 1.00 | 1.00 |
| Example3 | $Li_{1.1}Ni_{0.04}Mn_{1.86}O_4$ | 4 | 10 | 0.3 | 0.14 | 0.90 | 0.90 | 1.09 |
| Example4 | $Li_{1.1}Ni_{0.06}Mn_{1.84}O_4$ | 5 | 12 | 0.5 | 0.18 | 0.86 | 0.85 | 1.17 |
| Example5 | $Li_{1.08}Ni_{0.07}Mn_{1.85}O_4$ | 6 | 15 | 0.8 | 0.2 | 0.85 | 0.84 | 1.18 |
| Example6 | $Li_{1.05}Ni_{0.10}Mn_{1.85}O_4$ | 8 | 15 | 1 | 0.25 | 0.84 | 0.85 | 1.17 |
| Example7 | $Li_{1.05}Ni_{0.12}Mn_{1.83}O_4$ | 6 | 18 | 1.4 | 0.27 | 0.88 | 0.90 | 1.11 |

TABLE 2-continued

| | Average chemical composition | Average primary particle diameter (μm) | Average secondary particle diameter (μm) | Average surface layer thickness (μm) | Surface layer Ni content ratio | Initial resistance | Resistance increase rate after durability | Capacity retention rate after durability |
|---|---|---|---|---|---|---|---|---|
| Example8 | $Li_{1.05}Ni_{0.15}Mn_{1.80}O_4$ | 8 | 20 | 2 | 0.28 | 0.88 | 0.91 | 1.10 |
| Example9 | $Li_{1.05}Ni_{0.13}Mn_{1.82}O_4$ | 7 | 18 | 2.5 | 0.15 | 0.93 | 0.96 | 1.05 |
| Example10 | $Li_{1.05}Ni_{0.20}Mn_{1.75}O_4$ | 7 | 19 | 2.4 | 0.31 | 0.95 | 0.98 | 1.02 |
| Example11 | $Li_{1.05}Ni_{0.20}Mn_{1.75}O_4$ | 10 | 22 | 3 | 0.3 | 0.99 | 1.05 | 0.95 |
| Example12 | $Li_{1.05}Ni_{0.05}Al_{0.05}Mn_{1.85}O_4$ | 6 | 14 | 0.6 | 0.2 | 0.81 | 0.85 | 1.20 |
| Example13 | $Li_{1.05}Ni_{0.05}Mg_{0.05}Mn_{1.85}O_4$ | 5 | 11 | 0.5 | 0.18 | 0.82 | 0.85 | 1.19 |

As shown in Table 2, in lithium ion secondary batteries for evaluation of Examples 3 to 10 using a positive electrode active material having an average primary particle diameter of 4 μm to 8 μm, an average secondary particle diameter of 10 μm to 20 μm, and nickel atoms in the surface layer portion of the secondary particles, the initial resistance and the resistance increase rate after durability were reduced and the capacity retention rate after durability was improved as compared with Example 2 using a positive electrode active material containing no nickel atoms. In particular, where Example 2 and Example 4 were compared, it was confirmed that since the average primary particle diameter and the average secondary particle diameter were the same, it was possible to reduce the initial resistance and to suppress the resistance increase rate and improve the capacity retention rate after the cycle test by providing nickel atoms in the surface layer portion of the secondary particles.

Further, as shown in Examples 4 to 6, it was confirmed that when the average surface layer thickness was 0.5 μm to 1 μm and the surface layer Ni content ratio was 0.18 to 0.25, the initial resistance and the resistance increase rate after durability were further reduced and the capacity retention rate after durability was improved.

Furthermore, in Examples 12 and 13, it was confirmed that by using a positive electrode active material including an aluminum atom or a magnesium atom in addition to a nickel atom, the initial resistance and the resistance increase rate after durability were further reduced, and the capacity retention rate after durability was further improved.

Based on these facts, it is understood that with the positive electrode active material disclosed herein, it is possible to provide a non-aqueous electrolyte secondary battery which has a low initial resistance and in which an increase in resistance and a decrease in capacity retention rate due to repeated charging and discharging can be reduced.

The specific examples of the present disclosure have been described in detail above, but these are merely examples and do not limit the scope of claims. The techniques set forth in the claims include various changes and modifications of the specific examples illustrated above.

What is claimed is:

1. A positive electrode active material for use in a non-aqueous electrolyte secondary battery, the positive electrode active material comprising:
   a lithium manganese composite oxide having a spinel-type crystal structure, wherein
   the lithium manganese composite oxide includes secondary particles in which a plurality of primary particles is aggregated,
   an average particle diameter of the secondary particles based on a SEM image is 10 μm or more and 20 μm or less,
   an average particle diameter of the primary particles based on a SEM image is 4 μm or more and 8 μm or less, and
   nickel atoms are provided in a surface layer portion of the secondary particles.

2. The positive electrode active material according to claim 1, wherein the nickel atoms are unevenly distributed in the surface layer portion of the secondary particles.

3. The positive electrode active material according to claim 2, wherein an average value of a molar ratio (Ni/Mn) of nickel atoms to manganese atoms at a position showing a maximum concentration of the nickel atoms measured by energy dispersive X-ray spectroscopy (EDX) along a longest diameter of the secondary particle in a cross-sectional SEM image of the secondary particle is 0.14 or more and 0.31 or less.

4. The positive electrode active material according to claim 2, wherein an average thickness of the surface layer portion of the secondary particles in which the nickel atoms are unevenly distributed is 0.3 μm or more and 2.5 μm or less.

5. The positive electrode active material according to claim 1, comprising at least aluminum atoms or magnesium atoms.

6. A non-aqueous electrolyte secondary battery, comprising:
   a positive electrode, a negative electrode, and a non-aqueous electrolyte, wherein
   the positive electrode includes a positive electrode active material layer, and
   the positive electrode active material layer includes the positive electrode active material according to claim 1.

* * * * *